3,112,215
PREPARATION OF CATALYTICALLY ACTIVE
COATINGS
Samuel Ruosch and Louis Joris, Visp, Switzerland, assignors to Lonza Ltd., Gampel, Switzerland
No Drawing. Filed Oct. 7, 1960, Ser. No. 61,075
Claims priority, application Switzerland Oct. 9, 1959
1 Claim. (Cl. 117—62)

The invention relates to the preparation of catalytically active linings in hydrogen cyanide reactors.

For the hydrogen cyanide synthesis from ammonia and methane at temperatures of 900 to 1400° C., elongated reaction chambers are used whose walls are lined with a catalyst. Generally, platinum metals are used as catalysts, which may be alloyed with other metals or mixed with oxides such as $Al_2O_3$. For the preparation of such firmly adherent linings, solutions of metal compounds, e.g. of Al, Cu, Pt or other metals of the platinum group alone or in mixture with each other, are filled into the reactors, for instance into horizontally arranged tubes, and the tubes are heated whereby they are turned and the evaporated solvent is removed through axial apertures provided in the tube closures, through gas exhaust pipes or the like. In this way, dried salt coatings are obtained as an intermediary product. In order to obtain the desired thickness of the coating, the operation is repeated several times. The required concentration of the catalyst is about 10 to 30 mg. of platinum metal per $cm.^2$ of active surface, preferably about 20 $mg./cm.^2$. The thus obtained coatings are then heated above the decomposition temperature of the salt to obtain the metal catalyst. The heating step may be carried out with or without the passage of non-oxidizing gases, with or without air, or also in a current of gases such as $H_2$, $NH_3$, $N_2$.

It is a principal object of the invention to provide a method for improving the catalytic activity of such coatings comprising platinum metals and aluminum oxide.

According to the invention, the coating remaining after the removal of the solvent is first heated up to 800° C. in the current of a reducing gas, and then cooled; said operation is repeated until the wall of the reactor is coated with a sufficient amount of platinum metal and $Al_2O_3$. The thus obtained catalytic layer is heated to reaction temperature in presence of the reaction gases and activated in such a way that first only ammonia is passed over the catalyst. Subsequently, methane is added and, in order to prevent formation of carbon, the proportion of methane is increased so slowly that the methane content in the gases leaving the reactor, after removal of $NH_3$ and HCN, does not exceed 0.3 to 1 percent and is preferably about 0.5 to 0.7 percent by volume. The increase of the methane content in the feed gas must be so slow and gradual that the ratio $NH_3$ to $CH_4$ of 1:0.7 to 0.8 is reached, at the earliest, after 4 days.

In this way, hard and durable coatings of porous $Al_2O_3$ and platinum metals are obtained in which the platinum metal is homogeneously embedded in $Al_2O_3$. Such homogeneous distribution of the platinum metal in the aluminum oxide layer substantially reduces losses of platinum metal during operation and considerably increases the active life of the catalyst. Our novel way of catalyst activation shortens the activating time and avoids differences in the activity of different reactors. In addition, it prevents formation of carbon deposits and the resulting carburization of the platinum coating. We had found that formation of carbon may reduce the $Al_2O_3$ to metallic aluminum, which, in turn, may form AlN and alloys such as $PtAl_2$. We had further found that with increased formation of carbon, said alloys form small spheres which migrate into the lower parts of the reactor tubes and collect at the lower end thereof. Particularly, the carburization of the catalyst causes during operation a detrimental decrease of the catalyst activity due to the migration of the platinum metals, and alteration of the walls of the reactor tubes.

The carbon is formed by decomposition of the methane. Deposits of carbon in the catalyst layer must be avoided already at the activation of the catalyst. According to the invention, this is accomplished by increasing the methane content in the activating gas so slowly that the residual gas, after removal of $NH_3$ and HCN, does not contain more than 0.3 to 1 percent of methane and that only after at least 4 days the proportion of $NH_3$ to $CH_4$ in the feed gas reaches about 1:0.7 to 0.8. If, nevertheless, some carbon is formed, which is recognized by the pressure increase in the reactor tube, the activation must be discontinued and the carbon deposits formed in the upper part of the reactor tube must be removed by heating with air at about 900° C.; subsequently, the activation is resumed.

The preparation of the anhydrous salt layers with removal of the solvent by heating is a well known operation, whereby according to the temperature and heating time the salts may be partially decomposed with formation of $Al_2O_3$ or platinum metals.

The following examples illustrate the novel activation procedure.

Example 1

The inner wall of a sillimanite tube of 40 mm. diameter and 1500 mm. length is impregnated with about 75 $cm.^2$ of a hydrochloric acid solution of Al, Pt, and Ru; the Al content of the solution, calculated as $Al_2O_3$, is 4.25%, the content of Pt and Ru, calculated as $Pt_{88}Ru_{12}$, is 4%. The solution is placed into the horizontally disposed tube, which is then gently heated and slowly turned around its axis or an axis parallel thereto. Heating is carried out uniformly, for instance by a number of small heating gas flames, or electrically. The evaporation of the solution is accelerated by passing some air through the tube. After evaporation of the solvent, and drying of the residue at 150° C., there remains a dry coating of the salts. The thus coated tube is then heated in a furnace to 800° C., with passage of some ammonia. Then the tube is cooled. Said operation of impregnating, heating at 150° C., cooling, heating at 800° C. is repeated five times.

In this way, a coating is obtained which consists of a porous aluminum oxide layer in which the platinum metals are finely distributed and which is completely free of chlorine.

Subsequently, the coating is activated by heating the tube in a molybdenum furnace to an average temperature of 1200° C. At the same time, a current of 400 l./h. of ammonia is passed through the tube. Then methane is added, at such a slow rate that the methane content of the gas leaving the tube, after removal of HCN and $NH_3$, never exceeds the proportion of about 0.3 to 1 percent. With progressing activation, the addition of methane can be increased within 8 days so that the ratio of ammonia to methane reaches about 1:0.7. At that point, the activation in the activating furnace is terminated, and the reaction tube is ready for assemblage in the reactor.

For carrying out the HCN synthesis, it is of advantage to use two concentric tubes and to pass the reaction gases through the annular space between the tubes. In this case, the inner tube must be coated on its inner and outer side with the catalyst and activated.

Example 2

When two concentric sillimanite tubes are used, the outer reaction tube, which has a diameter of 40 mm. and a length of 2000 mm., is closed at one end and closed against the inner tube at the other end and provided with a radial outlet opening; the inner sillimanite tube, which is concentrically disposed in the outer tube and has a diameter of 28.33 mm. and a length of 2200 mm., is open at both ends.

The reaction gases are introduced from above through the inner sillimanite tube, pass at its lower end into the annular space formed between the two concentric tubes, and leave at the upper end of said space.

The externally heated inner wall of the outer reaction tube, and the inner and outer wall of the concentrically arranged inner tube are impregnated with platinum salts and aluminum salts and treated as follows:

For the impregnation, a hydrochloric acid solution of Al, Pt, and Ru is used; the Al content, calculated as $Al_2O_3$, is 1%, and the Pt and Ru content, calculated as $Pt_{88}Ru_{12}$, is 4%.

The two horizontally lying tubes are wetted with said solution for impregnation of the inner wall and then slowly rotated around the axis of the tube with gentle heating. The heating is carried out uniformly by electric resistance heating or with heating gases; the evaporation of the solution is accelerated by passage of some air. After evaporation of the solvent and drying of the residue by heating to 150° C., there remains a dry coating of the recited salts.

In order to impregnate the outer wall of the inner tube, the solution in somewhat more concentrated form is brushed upon the outer wall. Thereby, the tube is turned and heated at 100 to 120° C., so that the solvent evaporates quickly, whereupon fresh solution is brushed onto the dried areas. After a layer of the desired thickness has been formed, a dry uniform coating of said salts remains on the tube.

In a single impregnation step, 2 mg./cm.$^2$ of platinum metals are applied. When such a relatively small amount is applied, a completely uniform and firmly adhering deposit of $Al_2O_3$ and $Pt_{88}Ru_{12}$ is obtained.

The impregnation is repeated several times to apply to the walls of the tubes the required amount of catalyst.

On the externally heated active wall of the reaction tube, there is deposited by repeated impregnation in 10 steps a total of 10 to 30 mg., preferably about 20 mg., of platinum metals per cm.$^2$, which provides for optimum yields.

For the outer wall of the inner tube, 8 to 20, preferably about 16 mg., and for the inner wall 6–12, preferably about 8 mg., of platinum metals deposit per cm.$^2$ of active surface are sufficient.

It is of advantage to use for the last impregnation step a hydrochloric acid solution which contains only platinum metals and no aluminum.

The thus prepared coating on the surfaces to be activated consists of a porous layer of aluminum oxide in which the platinum metals are embedded in fine dispersion.

The thus coated tubes are then heated in a furnace up to 800° C. while some ammonia is passed therethrough, and then allowed to cool down.

The coatings prepared as set forth above are then activated. The reaction tubes are heated in an electrically heated oven to an average temperature of 1200° C. while a current of 400 l./h. of ammonia is passed therethrough; then, methane is added, whereby the addition of methane is increased so slowly that the methane content in the residual gas which leaves the outer reaction tube and is freed from $NH_3$ and HCN, does never exceed the amount of 0.3 percent.

Within an activation period of 8 days, the addition of methane can be increased so that the ratio of ammonia to methane reaches about 1:0.7. The activation in the activation oven is then terminated, and the reaction tube is ready for installation in the reactor proper.

After assemblage in the reactor, the activated tubes gradually receive the full load, whereby the ratio of $NH_3:CH_4$ reached in the activation procedure may be further increased to about 1:0.8.

For carrying out the synthesis of hydrocyanic acid, the reaction tubes provided with catalyst as set forth in Examples 1 and 2 were placed in an oven. A mixture of ammonia and methane was passed through the tubes at about 1200° C., and a gas mixture containing hydrocyanic acid was withdrawn from the outlet side of the tubes. After continuous operation for 12 months, the activity of the catalyst had remained unchanged. No carbon deposits were observed.

It is not recommended to apply solutions of the individual salts sequentially because such procedure does not produce a homogeneous layer in which the platinum metals are finely distributed in the aluminum oxide layer. In order to obtain a good catalyst, it is imperative to obtain a homogeneous layer. Theoretically, it might be thought that such solutions could be applied alternately in very thin layers, and that thus sufficient homogeneity could be obtained. However, in such a case, the impregnation would have to be carried out in a very great number, e.g. 50–100, steps in order to obtain the required thickness of the layer, which is about 0.005 to 0.05 mm.

With the commercially used concentrated solutions, the impregnating step must be repeated at least 5 times, preferably 5 to 12 times, in order to apply the coating of the desired strength. With more dilute solutions, the impregnation must be repeated a greater number of times.

This invention is a further development of the invention of the copending application Serial Number 562,330, filed by Samuel Ruosch on January 30, 1956, now abandoned.

We claim:

A method for the preparation of catalytically active coatings on the walls of reaction chambers for the synthesis of hydrogen cyanide from ammonia and methane at temperatures of 900 to 1400° C., said method comprising impregnating said walls with a solution containing a salt of aluminum and a salt of a metal of the platinum group, evaporating the solvent, drying, heating the obtained coating in the current of a reducing gas to form aluminum oxide and the metal of the platinum group, repeating said impregnation, evaporation, drying and heating steps until a sufficient amount of said metal and aluminum oxide has been deposited, and heating said deposit at reaction temperature for several days in such a way that first only ammonia is passed over the deposit and that methane is added at such a rate that the methane content in the gases after passage over the catalyst and after removal of $NH_3$ and HCN never exceeds 0.3 to 1 percent by volume and that not earlier than after 4 days a volume ratio of $NH_3:CH_4$ of 1:0.7 to 0.8 is reached.

References Cited in the file of this patent

UNITED STATES PATENTS

| | | |
|---|---|---|
| 2,412,868 | Brown | Dec. 17, 1946 |
| 2,739,945 | Thorn et al. | Mar. 27, 1956 |
| 2,768,876 | Wagner | Oct. 30, 1956 |
| 2,861,870 | Deyrup | Nov. 25, 1958 |

FOREIGN PATENTS

| | | |
|---|---|---|
| 685,744 | Great Britain | Jan. 7, 1953 |